J. P. METZGER.
COMBINED PRESSURE REGULATING AND GOVERNING APPARATUS.
APPLICATION FILED JAN. 14, 1920.

1,389,370.

Patented Aug. 30, 1921.
3 SHEETS—SHEET 1.

WITNESSES

INVENTOR
Jules P. Metzger
BY
ATTORNEYS

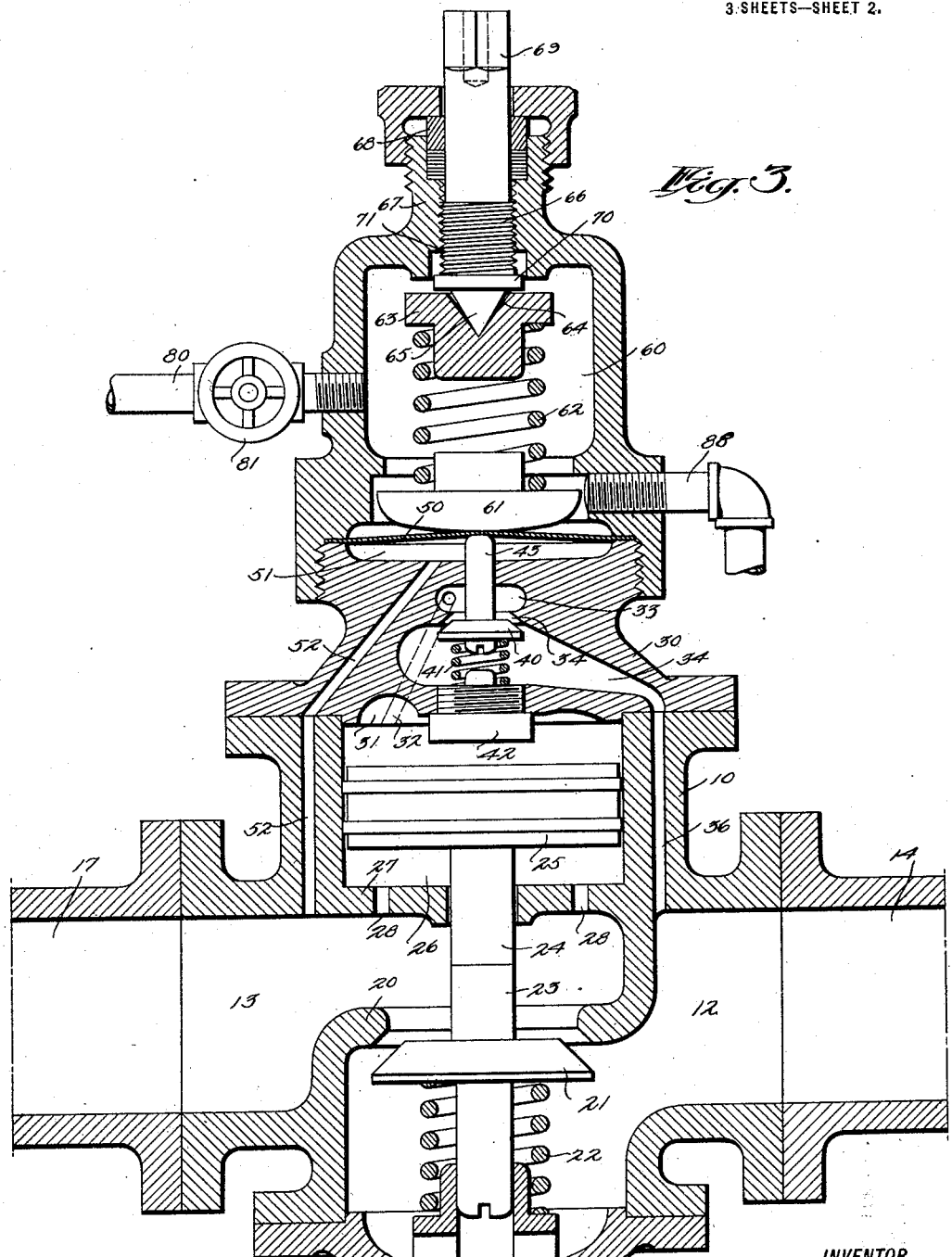

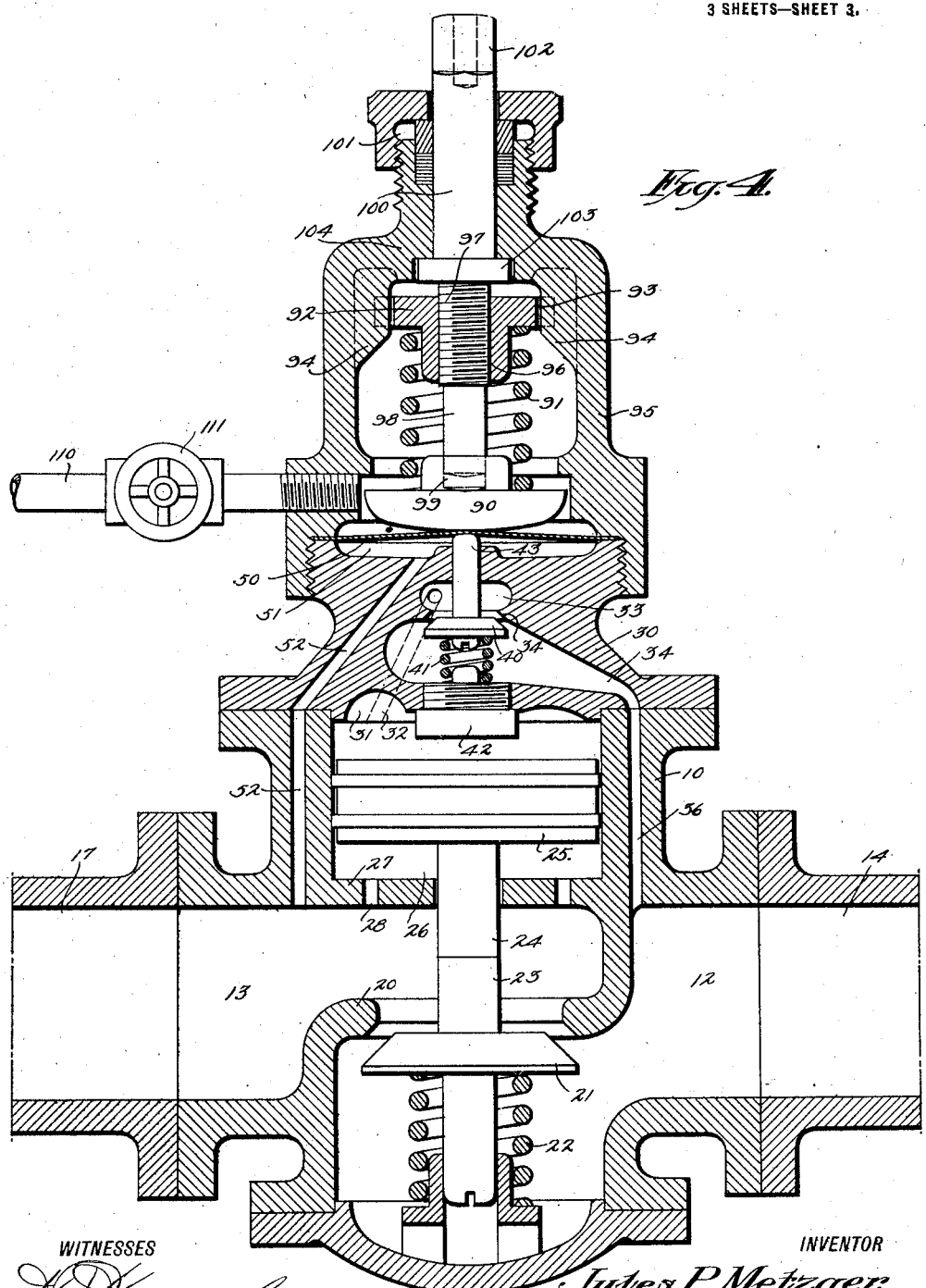

UNITED STATES PATENT OFFICE.

JULES P. METZGER, OF CARLSTADT, NEW JERSEY, ASSIGNOR TO THE LESLIE CO., OF LYNDHURST, NEW JERSEY, A CORPORATION OF NEW JERSEY.

COMBINED PRESSURE REGULATING AND GOVERNING APPARATUS.

1,389,370.      Specification of Letters Patent.      Patented Aug. 30, 1921.

Application filed January 14, 1920. Serial No. 351,355.

*To all whom it may concern:*

Be it known that I, JULES P. METZGER, a citizen of the United States, and a resident of Carlstadt, in the county of Bergen and State of New Jersey, have invented a new and Improved Combined Pressure Regulating and Governing Apparatus, of which the following is a full, clear, and exact description.

The invention relates to pressure regulators in which a diaphragm controls the action of a main valve, as shown and described for instance in the Letters Patent of the United States No. 1,244,226, and No. 1,308,638, granted to me on October 23, 1917, and July 1, 1919, respectively.

The object of the present invention is to provide a new and improved fluid pressure regulator arranged to maintain a predetermined pressure of the fluid passing through the regulator irrespective of boiler or initial pressure.

Another object is to permit of readily adjusting the regulator to vary the predetermined pressure more or less either by an adjustable spring setting device or by the pressure of another fluid or by the combined action of the said spring setting device and the pressure of the other fluid.

Another object is to allow the regulator to deliver steam or other fluid to an engine, for instance, at a predetermined pressure, the same as described in my patents above referred to.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is an enlarged sectional side elevation of a pressure regulator; and

Fig. 4 is a similar view of a modified form of the same.

Figure 1:
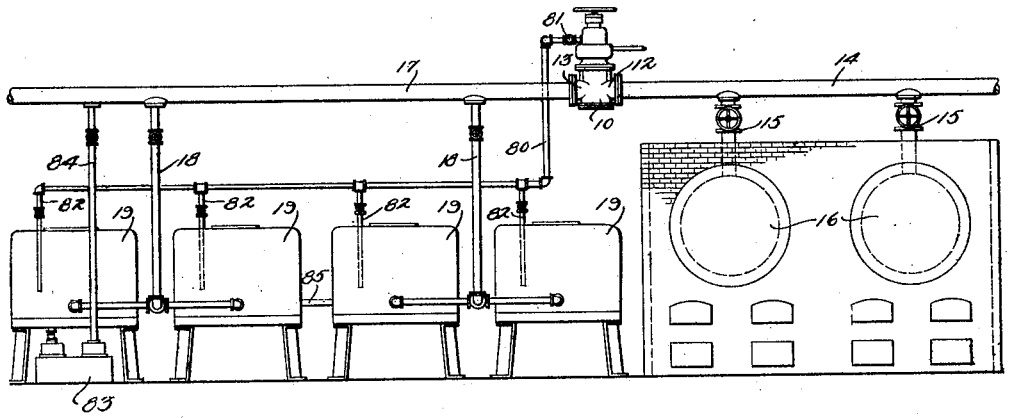
Figure 1 is a side elevation of the improved pressure regulator as applied to the header of a battery of boilers feeding into a plurality of receivers intended to carry a constant pressure lower than the boiler pressure.
Figure 2:
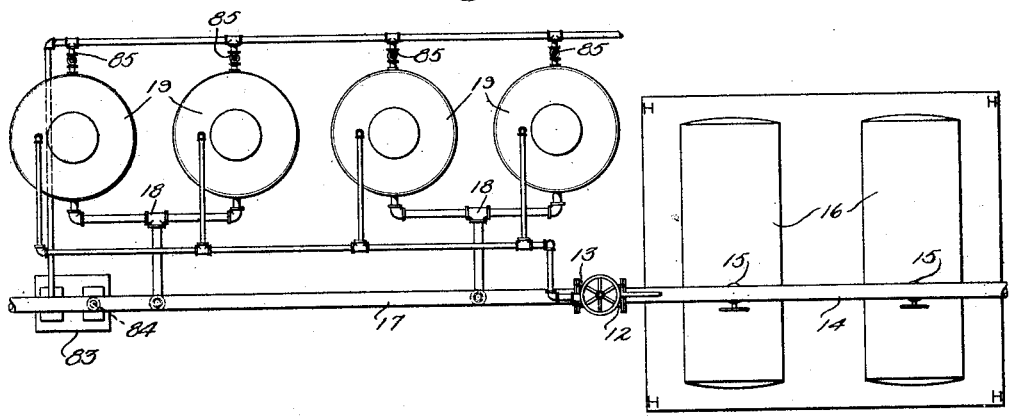
Fig. 2 is a plan view of the same.

The body 10 of the pressure regulator shown in Figs. 1, 2 and 3 is provided at one side with an inlet 12 and at the other side with an outlet 13, of which the inlet 12 is connected by a pipe 14 and valved branch pipes 15 with boilers 16 or other source of motive agent supply. The outlet 13 is connected by a pipe 17 and valved branch pipes 18 with receivers 19 to be supplied with steam under a lower pressure than that of the boilers 16. A valve seat 20 within the body 10 connects the inlet 12 with the outlet 13, and this valve seat 20 is controlled by a main controlling valve 21 normally held to its seat by a light spring 22. The upper end of the stem 23 of the valve 21 is connected with the stem 24 of a piston 25 mounted to reciprocate in a cylinder 26 formed within the body 10 and separated from the outlet 13 by a horizontal partition 27 having openings or ports 28 to connect the lower end of the cylinder 26 with the outlet 13. The upper end of the cylinder 26 is closed by a cap 30 provided at the under side with a recess 31 connected by one or more ports 32 with a chamber 33 arranged in the cap 30. The chamber 33 is provided at the under side with a valve seat 34 opening into an expansion chamber 35 formed in the cap 30 and connected by a port 36 with the inlet 12 and body 10. The valve seat 34 is normally closed by a controlling valve 40 extending within the expansion chamber 35 and pressed to its seat by a spring 41 on the top of a screw plug 42 screwing in the bottom of the expansion chamber 35. The upwardly extending stem 43 of the controlling valve 40 is engaged at its upper end by a diaphragm 50 held in a diaphragm chamber 51 arranged in the top of the cap 30 and connected by a port or opening 52 with the outlet 13 of the body 10.

The diaphragm 50 is fastened in position by a closed pressure chamber 60 screwed or otherwise secured to the top of the cap 30. Within this chamber 60 is arranged an adjustable spring setting device for the diaphragm 50 and this setting device comprises a head 61 engaging the top of the diaphragm 50 at the middle thereof and pressed on by a spring 62 abutting with its upper end on a seat 63 having in its top a V-shaped recess engaged by the lower pointed end 65 of a screw rod 66 screwing in the threaded upper portion 67 of the chamber 60. The screw rod 66 extends through a stuffing box 68 arranged on the top of the chamber 60, and the outer end 69 of the screw rod is made polygonal for the application of a wrench or other tool with a view to turning the screw rod 66 downward or upward to correspondingly move the seat 63 in a downward or upward direction to adjust the tension of the spring 62. The screw rod 66 is provided above the point 65 with a collar 70 adapted to abut against a shoulder 71 formed in the top of the chamber 60 to limit the upward movement of the screw rod 66. It is understood that by the arrangement described a spring setting device is provided whereby the diaphragm 50 is alive, lively and resilient at all times. In the particular use of the apparatus as shown in Figs. 1 and 2, the fluid chamber 60 is connected, by a pipe 80 having a valve 81 and branch pipes 82, with the vacuum chambers of the several receivers 19. It is understood that the vacuums in the several receivers 19 are controlled by a vacuum pump 83 driven by steam delivered from the pipes 17 to the vacuum pump 83 by the use of a valved branch pipe 84. The vacuum pump 83 is connected by valved branch pipes 85 with the vacuum chambers of the receivers 19, as plainly shown in Figs. 1 and 2. A drain pipe 88 is connected with the lower portion of the chamber 60 to drain the latter of water or other liquid that may accumulate in the said chamber.

In the modified form shown in Fig. 4, the construction of the regulator proper is the same as above described and hence further description of the same is not deemed necessary. The spring setting device in this case is different from the one disclosed in Fig. 3 and is arranged as follows: On the top of the diaphragm 50 rests a head 90 pressed downward by a spring 91 seated at its upper end on a seat 92 provided with notches 93 engaging vertical guideways 94 formed on the inside of the closed chamber 95 screwed or otherwise secured to the top of the cap 30, the same as the chamber 60 above referred to. The seat 92 is provided with a threaded central opening 96 in which screws a screw rod 97 having a lower non-threaded portion 98 engaging a central recess 99 formed in the top of the head 90. The screw rod 97 is provided on the top with a non-threaded end 100 extending through a suitable stuffing box 101 arranged on the top of the chamber 95, and the upper outer end 102 of the extension 100 is made polygonal for the application of a wrench or other suitable tool with which to turn the screw rod 97. It will be noticed that on turning the screw rod 97 the seat 92 is screwed up or down thus correspondingly adjusting the tension of the spring 91. The extension 100 of the screw rod 97 is provided with a collar 103 seated in a seat 104 formed in the top of the chamber 95. A pipe 110 having a valve 111 connects with the lower portion of the chamber 95 and this pipe corresponds with the pipe 80 above referred to and is connected with the receivers 19 so that another fluid under pressure can pass into the chamber 95 to act on the diaphragm 50. It is understood that both chambers 60 and 95 are steam-tight.

Presuming that the pressure regulating device is installed in a pipe line ready for service, that is, with a fluid under pressure such as steam from the boilers or other source of supply entering through the inlet 12, it is evident that a predetermined pressure can be obtained by adjustment through screw rods 66 or 97 whereby the fluid passing through the outlet 13 reacting through the port 52 under the diaphragm 50 until equilibrium of the parts is established and the feeding of the fluid to the receivers, engines or other devices or apparatus continues to be constant so that in this respect the regulator performs the same functions as the regulators shown and described in the Letters Patent above referred to.

Suppose, however, that the regulator is to feed from one boiler at a high pressure, into another one at a lower pressure, or, again, as is sometimes the case, the device to be used to obtain an equalizing pressure from a source of supply in several tanks, receivers, etc., the initial pressure in these cases, the source of supply itself should become the means of regulation, as it depends entirely on its pressure and volume that the average pressure can be obtained through the system, etc., principally so where in some cases the initial pressure is fluctuating greatly as for instance where several tanks, heaters, etc., are supplied by one main distribution line and one or the other, or, in fact, several of the units are instantly shut off, or some part in operation within a short time, in such cases, the various branch connections, some far from the initial source of supply, will cause some fluctuation, the initial pressure will in some cases fluctuate very greatly, and, in fact, so much so as to be severe test on the boilers. An ordinary device to control a fluid at a predetermined pressure is, in this case, of no value whatever, as the abnormal demand of fluid will under such conditions sometimes vary as much as fifty per cent., and there is danger of too large demand on the boiler.

With my improvement, however, it becomes possible to entirely release the spring device and by opening the small stop valve or connection to fluid chamber, said connection leading to a small constant source of supply, the steam will act on the diaphragm and become the adjustable means, viz.; the supply pressure will open the regulating valve at its maximum under the conditions, but only in accordance with the steaming capacity of the boiler or boilers, or the capacity of the receivers, thereby protecting the latter from becoming possibly emptied and from accident thereby.

Again, in some cases, the pressure regulator being set by the spring device to furnish only a small amount of fluid, and a great amount being necessitated through conditions of service, by opening the stop valve, the regulator will be capable of making for that time the demand upon it, irrespective of the adjusting spring device, but the latter will revert to the same regulation when the stop valve is closed.

My improvement allows a regulator to be actuated independently by two different means, without making changes in the apparatus itself nor reducing its efficiency.

Either one of the two devices shown and described may be applied with equal results, and be controlled in chamber 60 or 95 by any different fluid than the one delivered, for instance, from a boiler or from an air reservoir. In the former case, the pressure from the boiler might regulate the delivery pressure of the air passing through the regulator, or again the air pressure in the chamber 60 or 95 might control the pressure of steam passing through said regulator, and therefore there are many conditions that may be met by my improvement that could not be heretofore.

The improvement can be used in service, for instance, regulating the highest pressure to the lowest one by setting the first regulator at a low predetermined pressure and using the outlet low pressure to act on the diaphragm of the second regulator, not preventing each regulator to feed their various auxiliaries as required, and at different predetermined pressure and this without interference from either one, nor impairing the sensitiveness of the apparatus, it will be noted that all parts of the apparatus are most sensitive and free to move in unison; the regulator is automatic in its action, and no packing is used that will induce frictional resistance, the internal member, in chamber 60 or 95 acting in axial line, being all free to move, the diaphragm is susceptible to the slightest action on either side of same, through either fluid or spring, and all members forming with the chamber the most resilient adjusting and regulating medium.

Another application of the regulator in which the same is of prime importance, is the regulation of pressure in a receiver, to keep the latter at a given pressure, and may be applied to the receiver of a compound engine or multiple cylinder engine, with intermediate receivers. Regulation will keep up the receiver at its quota of pressure to produce the most efficient results of the engine in each case, the receiver may be connected to the fluid chamber, and the adjusting device set for the receiver pressure. Should the receiver pressure fall below its quota, the regulator will feed in said receiver, but as soon as the equilibrium is established, the regulator will shut off the supply. There are other uses to which the improvement can be applied, for instance, by connection to a condenser, in case of failure of the vacuum, the pressure acting on the diaphragm, causing to open the controlling valve, and the regulator made to feed the air pump to restore the vacuum. These examples are only to illustrate the worth and importance of my improvement. It is simple in construction, most sensitive in operation, compact, cannot get out of order, and can be applied in the ordinary kind of engineering service. The adjustability permits it to be used as a regulator, capable to be controlled by various fluids besides its independent adjustable means, and thereby producing a regulator and governing device capable of extended use in the field it occupies, and fulfilling conditions that no other device is capable of.

Having thus described my invention, I claim as new and desire to secure by Letters Patent:

1. A pressure regulator, comprising a main controlling valve for controlling the pressure of a fluid passing through the regulator, a diaphragm exposed at one side to the said fluid pressure, a chamber at the other side of the diaphragm and connected with another source of pressure supply, and a spring setting device in the said chamber engaging the said other side of the diaphragm.

2. A pressure regulator, comprising a main controlling valve controlling the pressure of a fluid passing through the regulator, a diaphragm exposed at one side to the said fluid pressure, a chamber at the other side of the diaphragm and connected with another source of pressure supply, and a manually adjustable spring setting device in the said chamber engaging the said other side of the diaphragm.

3. A pressure regulator and receiver or vacuum valve consisting of a pressure regulating valve operated by a diaphragm, fluid delivery pressure acting under said diaphragm, a fluid chamber connected with vacuum or fluid pressure from a different source acting on top of said diaphragm, means of controlling the distribution of said pressure to said fluid chamber and flexible spring adjusting means located in said fluid chamber, with means of adjustment on the outside of the regulator.

4. A pressure regulator consisting of a casing having an inlet and outlet, separated by a partition, an opening in said partition, a cylinder, a main valve operating over said opening, through a piston working in said cylinder, an auxiliary valve controlling means to supply fluid pressure to top of said piston, a diaphragm located above and contacting said auxiliary valve, outlet fluid pressure means to the under side of said diaphragm, inlet fluid pressure means to said auxiliary valve, a fluid chamber above said diaphragm, means of controlling fluid to said fluid chamber, also independent spring adjusting means in said fluid chamber capable of manipulation from the outside of the casing.

JULES P. METZGER.